(12) United States Patent
Margalit et al.

(10) Patent No.: US 10,628,610 B2
(45) Date of Patent: *Apr. 21, 2020

(54) IDENTIFYING STOLEN DATABASES

(71) Applicant: INTERNATIONAL BUSINESS MACHINES CORPORATION, Armonk, NY (US)

(72) Inventors: Oded Margalit, Ramat Gan (IL); Ravid Sagy, Beit Yizhack (IL)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/170,243

(22) Filed: Oct. 25, 2018

(65) Prior Publication Data
US 2019/0065784 A1 Feb. 28, 2019

Related U.S. Application Data

(63) Continuation of application No. 15/590,484, filed on May 9, 2017, now Pat. No. 10,474,843.

(51) Int. Cl.
| | | |
|---|---|---|
| *G06F 21/00* | (2013.01) | |
| *G06F 21/64* | (2013.01) | |
| *H04L 29/06* | (2006.01) | |
| *G06F 21/57* | (2013.01) | |
| *G06F 21/62* | (2013.01) | |

(52) U.S. Cl.
CPC .......... *G06F 21/64* (2013.01); *G06F 21/577* (2013.01); *G06F 21/6245* (2013.01); *H04L 63/08* (2013.01); *H04L 63/1408* (2013.01); *H04L 63/1416* (2013.01); *H04L 63/1433* (2013.01); *H04L 63/1491* (2013.01)

(58) Field of Classification Search
CPC .... G06F 21/64; G06F 21/6245; G06F 21/577; H04L 63/1491; H04L 63/1433; H04L 63/08; H04L 63/1416; H04L 63/1408
See application file for complete search history.

(56) References Cited

U.S. PATENT DOCUMENTS

| | | |
|---|---|---|
| 8,256,006 B2 | 8/2012 | Grzymala-Busse et al. |
| 2008/0034424 A1 | 2/2008 | Overcash et al. |

(Continued)

FOREIGN PATENT DOCUMENTS

WO 2008011576 A2 1/2008

OTHER PUBLICATIONS

IBM: "List of IBM Patents or Patent Applications Treated as Related", Oct. 30, 2018, 2 pages.

(Continued)

*Primary Examiner* — Kendall Dolly
(74) *Attorney, Agent, or Firm* — L. Jeffrey Kelly

(57) ABSTRACT

A method, computer system, and a computer program product for identifying a hacked database is provided. The present invention may include generating a marked account using a plurality of data. The present invention may then include initiating a first transaction using the generated marked account. The present invention may also include determining that a second transaction has occurred using the generated marked account. The present invention may further include receiving notification of the second transaction based on determining that the second transaction occurred.

20 Claims, 6 Drawing Sheets

(56) References Cited

U.S. PATENT DOCUMENTS

| | | |
|---|---|---|
| 2009/0292619 A1 | 11/2009 | Kagan et al. |
| 2010/0235919 A1 | 9/2010 | Adelstein et al. |
| 2011/0307382 A1* | 12/2011 | Siegel .................. G06Q 20/04 |
| | | 705/44 |
| 2013/0160116 A1 | 6/2013 | Martin et al. |
| 2015/0073981 A1 | 3/2015 | Adjaoute |
| 2016/0072835 A1 | 3/2016 | Roytman et al. |
| 2017/0213052 A1 | 7/2017 | Michel et al. |
| 2018/0018657 A1* | 1/2018 | Sawant ................. G06Q 20/36 |

OTHER PUBLICATIONS

U.S. Appl. No. 15/590,484 entitled "Identifying Stolen Databases", filed May 9, 2017, 32 Pages.
U.S. Appl. No. 15/892,478 entitled "Identifying Stolen Databases", filed Feb. 9, 2018, 29 Pages.
Mell et al., "The NIST Definition of Cloud Computing," National Institute of Standards and Technology, Sep. 2011, p. 1-3, Special Publication 800-145.
Ng et al., "Applying Data Mining Techniques to Intrusion Detection," 2015 12th International Conference on Information Technology—New Generations, 2015, p. 800-801, IEEE Computer Society.
Patel et al., "A Survey of Intrusion Detection and Prevention Systems," Information Management & Computer Security, 2010, p. 277-290, vol. 18, Issue No. 4, Emerald Group Publishing Limited.
Korolov, "Deception Technology Grows and Evolves", CSO Feature, Aug. 29, 2016, pp. 1-4.
Bowen et al., "A System for Generating and Injecting Indistinguishable Network Decoys", https://www.semanticscholar.org/paper/A-system-for-generating-and-inje . . . , Published 2012 in Journal of Computer Security, pp. 1-24.

* cited by examiner

IDENTIFYING STOLEN DATABASES

BACKGROUND

The present invention relates generally to the field of computing, and more particularly to database security.

Undetected data breaches happen more commonly than is known to the general public. Hacked networks may even go months without detecting such a breach since a breach may not be known even after the hacker attempts to use the compromised data. A customer's personal information may be stolen without a company detecting that customer information stored in a database has been stolen. The nature of how data may be compromised has changed with the transformation in security infrastructure.

SUMMARY

Embodiments of the present invention disclose a method, computer system, and a computer program product for identifying stolen databases. The present invention may include generating a marked account using a plurality of data. The present invention may then include initiating a first transaction using the generated marked account. The present invention may also include determining that a second transaction has occurred using the generated marked account. The present invention may further include receiving notification of the second transaction based on determining that the second transaction occurred.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
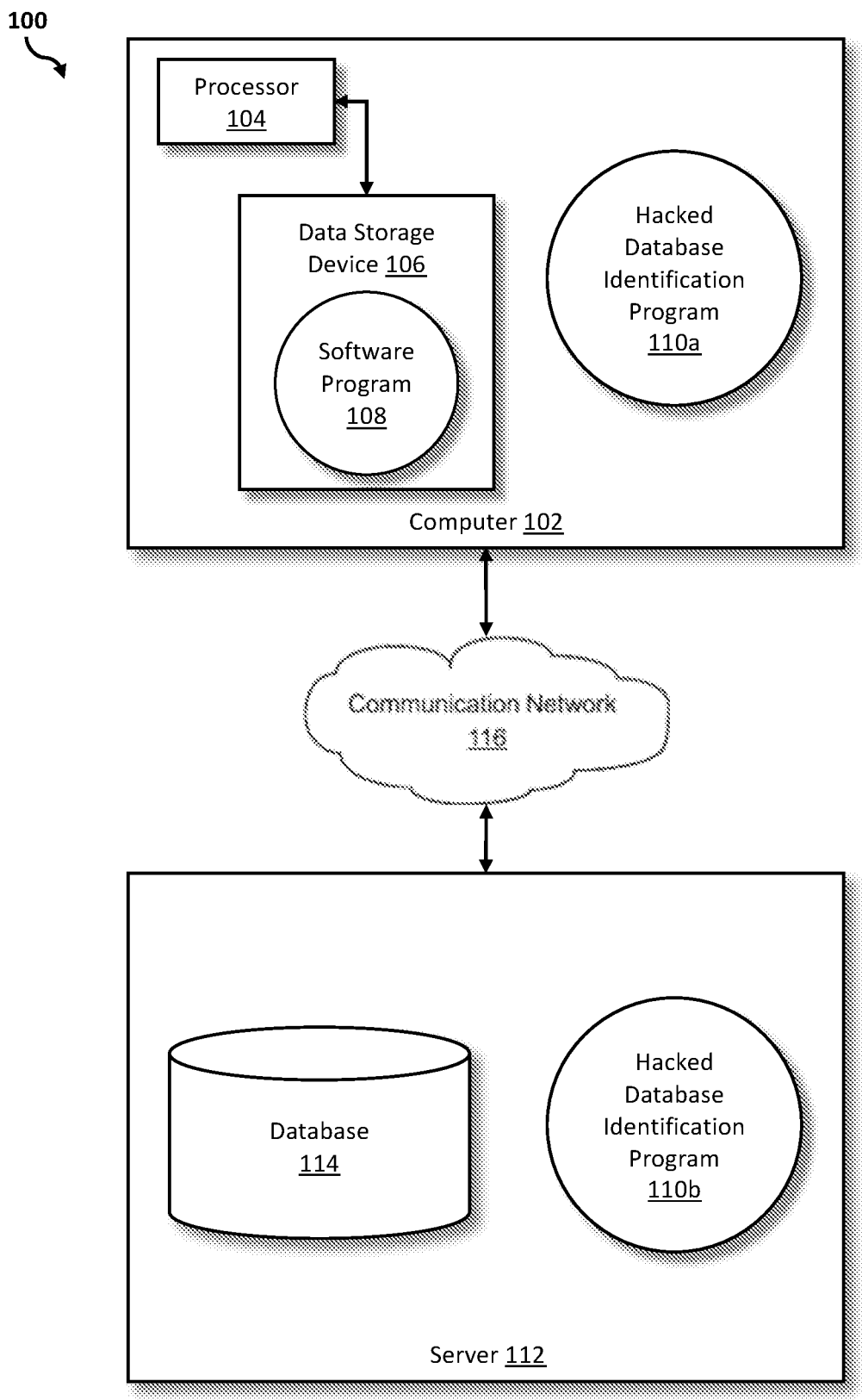
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for identifying hacked databases. As such, the present embodiment has the capacity to improve the technical field of database security by identifying which database may have been hacked. More specifically, a merchant database storing personal customer data may be compromised by a hacker obtaining access to the database and stealing customer information. The described embodiment may identify what database information may have been compromised by implanting marked data that may alert the proper entity when used by the hacker or used by a person who may have purchased the stolen data from the hacker.

As previously described, undetected data breaches happen more commonly than is known to the general public. Hacked networks may even go months without detecting such a breach since a breach may not be known even after the hacker attempts to use the compromised data. Personal information may be stolen without an entity or a company detecting that customer information stored in a database has been stolen. The nature of how data may be compromised has changed with the transformation in security infrastructure. A method for identifying database breaches when the stolen information has been used without authorization and notifying the proper entity or authority may provide a more secure database environment.

Generally, the public may be aware of database breaches that have been detected and announced publicly. Correspondingly, the public may not be aware if a hacker has breached a customer database if the breach has not been detected or if the breach was not announced by an organization. Months or even years may pass before an organization detects a compromised database. If a network breach goes undetected for 8 months, then an entity, an organization or customers may not have known protection was needed. For example, if a hacker has stolen social security numbers from a database, by the time a customer, a merchant, an entity, an organization or the proper authorities have been alerted, the hacker may have already stolen identities, used the social security numbers or have sold the social security numbers through non-legal channels. According to another example, if a hacker has stolen credit card data from an entity's database or an organization's database, the hacker may either wait to use the stolen credit card number or may sell the credit card numbers to another person who may not immediately use the stolen data. Meanwhile, merchants, entities, organizations, customers or the proper authorities may not know the data has been compromised and customers may not be provided with information for a proper response such as to close a credit card account or to seek assistance for identity theft.

Regulations and security infrastructure may have evolved to handle identifying a database breach, however, hackers may have also evolved the nature of database breaches. Breaches may no longer be a binary proposition when a merchant's database, an organization's database or a government entity's database may or may not have been breached. The evolved nature of security breaches may include a variance in severity and ramifications to breached databases, core constituencies and partners to database owners who store personal information. This new and changing nature of database breaches may require a method to detect the severity of a breach since there may not be a way to consistently detect database breaches. Therefore, it may be advantageous to, among other things, provide a method to identify which database has been breached by a hacker once the hacker uses the breached data by placing marked data (i.e., data that may be traced) into databases associated with customer information which may be stolen by hackers.

For the present embodiment, an organization, for example, may include an entity that processes payments for customers (i.e., a service provider) or stores customer data for merchants (e.g., users). Merchants may also store customer data and may use service providers as a third-party authority to communicate with the banks to process payments for goods or services. Merchants may include consumer goods stores, restaurants, online stores, service based companies or a company that may accept payments by a credit card or a bank card. Merchants may also include hospitals or a government office. Merchants and organizations may store both citizen data and non-citizen data since an organization may transact accounts and business in other countries. An online store, for example, may sell products to consumers globally. Another example of diverse transactions may include an encounter when either a citizen or a non-citizen receives a parking ticket. The individual who receives the parking ticket may pay the parking ticket using a government online portal that allows an online payment method. The online payment for the parking ticket may be paid via a credit card where the individual's personal information and the individual's credit card may be processed by the government entity's service provider. Companies that offer services may include services that both process payments and store personal information such as a law office, an accounting firm, a finance firm or a medical facility. Other types of service companies that may process payments may include services such as landscaping, plumbing, architecture, housecleaning, or contractor services.

A service provider may process credit card or bank card payments for a merchant. The service provider may be an organization that communicates with banks to retrieve authorization for the individual's purchase with a merchant. A merchant may offer services to customers such as saving a customer's name, address and credit card number on file (i.e., in a merchant database) for ease of future purchases with the same merchant. A customer who may shop at one or more online stores often may benefit from having the merchant save personal information to create a faster and more streamlined purchase without the need to input a credit card number for each purchase, therefore, saving the customer time. Once the customer opts to save a credit card on file, the merchant may store the customer's personal information and credit card number in a database for accessibility for the next customer authorized purchase.

Databases may store a plurality of data including information personal to customers locally and around the world. An individual, for example, may be susceptible to having personal data stolen by a hacker out of a database if the individual has purchased an item from a merchant using a credit card or if the person has submitted personal information to an entity such as a doctor's office or a government entity. Personal information on a database may include data such as credit card numbers, social security numbers, email addresses, residence addresses, birth dates, usernames, passwords, personal identification numbers, biometric data and other identifying information. Credit card transactions may be processed at a brick and mortar store, at an online store, using a wireless terminal, or using a mobile device such as a cellular phone or a tablet. Since the plurality of data that may be stored on a database is variant in nature, difficulties may ensue while identifying the origin of stolen data.

Protecting customer information may require the ability to identify the hacked database source to ensure the proper entity, organization or authority may take necessary precautions to protect customers.

According to at least one embodiment, the hacked database identification program may add marked data into a database for monitoring. Monitoring for usage of the marked data may provide a source of the stolen data once the stolen data is used by the hacker or a person who has received the compromised data. Unauthorized usage of the stolen data may indicate the database has been compromised. Additionally, if marked data is used by the hacker or the person who received the compromised data, then the authority of the marked data may identify that the database has been compromised and may also locate the source of the stolen information (i.e., which database has been hacked). One set of marked data may relate to one merchant or one database. If a particular set of marked data is used by a hacker or a person who received the compromised data, then the authority of the marked data may know which marked account was used and which entity the marked data was associated with (i.e., which entity the authority of the marked data created an account with).

Marked data may be data that is traceable. Information that may be marked may include data such as social security numbers, credit cards or other stored data that may be valuable to a hacker. Marked data may be associated with fictitious data or real data. Marked data may also be associated with both fictitious data and real data, such as an imaginary customer made up as a decoy but the created fictitious customer information is linked to a credit card associated with or linked to real assets (i.e., a credit card that can process a payment). Marked data may be created or used for the purpose of waiting until an unauthorized person uses the data. Marked data may be saved in a database with customer data and if the marked data is used then the hacked database identification program may operate as an alarm and notify the entity or service provider who created the decoy account of the unauthorized use. An alternative notification may come from a credit card company who issued the credit card to the service provider where the credit card account may be a marked account. Here, the credit card company may be a financial institution and may alert the service provider that the marked credit card has been used. The notification from the financial institution to the service provider may be a message on a computing device over a communication network. The hacked database identification program may also identify a specific database that may have been breached once the marked data is used since the fictitious data specific to the valid linked credit card may be present in one particular database. The marked data may also be present in more than one database.

The marked data may also be associated with fictitious non-valid data linked to detect usage when a hacker may attempt to use the fictitious data, such as a fake social security number, a fake account number or a fake username and fake password. The fictitious data may be associated with a real account created with a merchant, but the fictitious account may be created for the purpose of being a decoy. Entering the marked data into an online account that saves the data to a database may mimic the regular way an online profile is entered into the database (i.e., the regular way a real customer may enter data to create an online profile) to reduce the chance of automatic detection since even the owner of the database may not know about the fictitiousness of the data. For example, a security service provider may create one or more valid credit card accounts for the purpose of a decoy account.

In the present embodiment, for example, a merchant that may use a service provider to process payments may know or may not know the service provider is using the hacked database identification program to transmit marked data to the merchant database that stores credit card numbers. The service provider may place a valid order with the merchant using arbitrary, imaginary user data associated with credit card linked to real assets. The service provider may be a user operating a computing device running the hacked database identification program. The service provider may process a purchase with a merchant similar to a customer and the merchant may or may not know of the decoy purchase using a marked account. The decoy purchase is a real purchase to get the fictitious account linked to a functioning credit card into the merchant database that stores customer data. More than one marked order may be placed with the merchant. One or more marked accounts may be placed and stored in the same merchant storage database. One or more marked accounts may be placed and stored in a plurality of merchant storage databases.

Then the hacked database identification program may determine a database breach when a hacker executes a purchase with the marked stolen credit card number. Next, the hacked database identification program may notify the security service provider. The service provider may determine which specific database the hacker may have compromised using the hacked database identification program. The database storing the marked account may be the hacked database if the credit card associated with the marked account was used since the decoy marked account may not be authorized to be used. Use of the decoy marked account may indicate to the hacked database identification program that a specific database may have been compromised. The service provider may then take several possible courses of action, such as notify the merchant who has the customer records, notify the authorities who may track the hacker, or allow the hacker to execute the purchase or multiple purchases to attempt to identify the mule places. A money mule may be a person who receives payment for the service of transferring illegal money. The transfer of illegal money may be moved in person, through another service or electronically. The hacked database identification program may alert the security service provider when the marked data has been used, which may occur soon after the marked data is stolen or may occur months or years after the marked data is stolen. The hacked database identification program may identify a database that has been compromised once the hacked data has been used or even before being used, for example, when intercepted upon publication on the dark web.

Another embodiment may be further enhanced by periodically adding marked data into a database (i.e., periodic merchant orders) to narrow down a time frame in which the database has been hacked. This embodiment may, for example, add marked data into the same merchant database once per month and usage of stolen data may indicate when the database was compromised. If marked data was inserted into a database every month, the data used by a hacker may be determined based on what month the marked data was inserted This method may give the company or the proper authorities an approximate 30-day window in which the database was compromised. Further, marked data may be inserted every day to create a narrow window to determine when the database may have been compromised. The time frame may also be extended longer than a monthly insertion of marked data into the database if a narrow time frame is not ideal.

An alternate embodiment may include a merchant (e.g., a user) that wishes to utilize the marked data generating feature by manually entering the marked data (i.e., fabricated data) into, for example, the merchant website. Additionally, marked data may be generated periodically, or by automating periodic marked data generation so the merchant may receive periodic data to enter manually into the merchant website. The marked data, once entered by the user, may be stored with the data received from non-fictitious customers on a secure merchant database (e.g., an encrypted database that follows a data security standard (DSS) protocol) or the merchant may utilize (i.e., by contracting with or hiring) an outside source or company to store secure customer data (e.g., a secure storage service provider). An entity who accepts customer data and marked data for storage on a database may be a merchant or a service provider.

Marked data may be entered manually by, for example, a merchant, one time or multiple times. Entering the data multiple times may provide more data points on a timeline. The marked data entered by the merchant may include the same data types a customer may enter to create an online account or to pay for products offered by a merchant, business or service. Entering more data points on a timeline of entries may allow a merchant or service provider to determine when the database was hacked with a higher accuracy than if there were less data points entered. For example, if a merchant entered the following fictitious data (e.g., name, telephone number, residence address, email address and credit card information) at the following times:

| Database 1 | | |
|---|---|---|
| Time | Fictitious Data Entered and Stored | |
| T = 0 | Fictitious Data 0 | |
| T = 1 | Fictitious Data 7 | |
| T = 2 | Fictitious Data 5 | Database hacked |
| T = 3 | Fictitious Data 1 | |
| T = 4 | Fictitious Data 3 | |
| T = 5 | Fictitious Data 11 | |

| Database 2 | |
|---|---|
| Time | Fictitious Data Entered and Stored |
| T = 6 | Fictitious Data 2 |
| T = 7 | Fictitious Data 10 |
| T = 8 | Fictitious Data 6 |
| T = 9 | Fictitious Data 9 |
| T = 10 | Fictitious Data 4 |
| T = 11 | Fictitious Data 8 | then the merchant may have the ability to identify that the data stored in database 1 at the time T=2 may be data that a hacker has obtained (i.e., fictitious data 5, fictitious data 7 and fictitious data 0). The trigger that database 1 has been hacked may be identified by the attempted use of the marked data (i.e., Fictitious Data 5) by the hacker. Additionally, customer data entered prior to the database hack at T=2 may have been compromised. Periodic data entries, for example, every week or every day may be manually entered by the user.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a hacked database identification program 110a. The networked computer environment 100 may also include a server 112 that is enabled to run a hacked database identification program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the hacked database identification program 110a, 110b may interact with a database 114 that may be embedded in various storage devices, such as, but not limited to a computer/mobile device 102, a networked server 112, or a cloud storage service.

The computer 102 may be a merchant computer, a customer computer, a user computer or a network service provider computer that may run the hacked database identification program 110a. The server 112 may be used by a merchant, a customer, a user or a network service provider and the server may run the hacked database identification program 110b.

According to the present embodiment, a merchant or a service provider using a computer 102 or a server computer 112 may use the hacked database identification program 110a, 110b (respectively) to identify stolen databases. The hacked database identification method is explained in more detail below with respect to FIG. 2.

Figure 2:
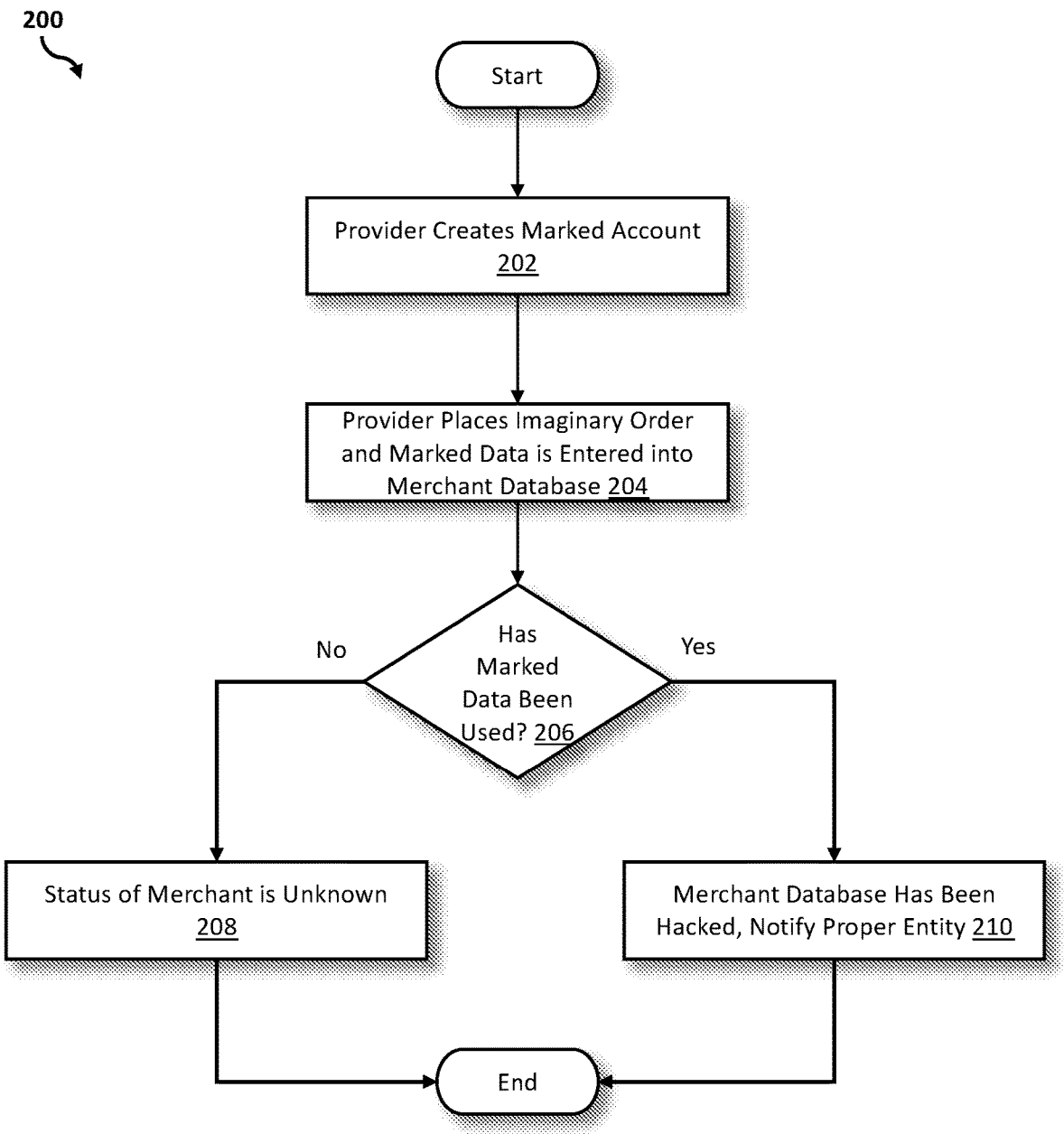
FIG. 2 is an operational flowchart illustrating an example of a process for identifying hacked databases according to at least one embodiment.

Referring now to FIG. 2, an operational flowchart illustrating an example of a hacked database identification process 200 used by the hacked database identification program 110a, 110b according to at least one embodiment is depicted.

At 202, the service provider creates a marked account. The service provider may create a marked account by using the same process a customer may use to create an account with a merchant, an organization or an entity. The marked account may be an online merchant account and may be created with the proper details relied upon by the merchant to associate a customer with the account, such as a name, address, email address, username and password. The newly created account may be linked to a credit card for purchases. The credit card may be issued from a credit card company (i.e., financial institution). The details of the service provider account may be fictitious, however, the credit card account may be valid, able to be processed and marked by the hacked database identification program 110a, 110b. The service provider account created with a merchant may be marked to identify which database has been hacked. The marked account may be associated with a valid credit card or the marked account may be associated with other sensitive data such as a social security number. The service provider may create a plurality of marked accounts with a single merchant or a plurality of merchants. The created marked account or the multiple created marked accounts may be listed and saved in the service provider data repository and each created marked account may be associated with a merchant database. The service provider may keep the saved list of marked accounts associated with each merchant to know where each marked account is being stored and which merchant database is storing the marked account. The service provider may choose to save the created marked account, including the credit card number, on the merchant's website. The merchant website may then store the marked account in a database that holds valuable customer data that a hacker may want to compromise.

For example, the service provider creates an online profile with a clothing merchant store. In order to create an online profile, the merchant website requires the user, here the service provider, to provide an email address, username and password to create the online profile. The service provider uses fictitious data to create the online profile with the merchant.

Then, at 204, the service provider places an order and the marked data is entered in the merchant database. The service provider may place an order with a merchant for a good or service the merchant may be selling. The order may be placed using the marked account and the merchant may not know about the marked account. The service provider may choose to create a marked account with the merchant's knowledge or without the merchant's knowledge. Once the order is placed, the fictitious data and valid marked credit card number may be transmitted into a merchant database or a third-party database with other customer data. If the database is hacked and the hacker uses the stolen customer data and credit card numbers, then the hacked database identification program 110a, 110b may identify which database has been hacked based on which marked account the hacker may have used.

Additionally, the service provider may place more than one order with the same merchant using a different set of marked account details (i.e., fictitious details linked to a valid marked credit card) at different time periods (i.e., periodic merchant orders) to establish a time frame the hacker may have compromised a certain database. Different fictitious marked accounts may be used for different merchants and different databases to identify a particular database with a particular fictitious marked account. The service provider may create a new marked account for each order placed with a merchant. Continuing from the previous example, the service provider will place an order using the online profile previously created with the clothing store merchant. The service provider will enter a name, address and phone number associated with a valid credit card to complete the order. The marked account details are then stored in the merchant database that stores other customer order information and payment details.

Next, at 206, the hacked database identification program 110a, 110b determines if the marked data has been used. Marked data may be identified upon use. The marked data, such as a valid credit card in possession of the service provider, may be created for the purpose of alerting the service provider of use. For example, if a hacker has compromised a database of information including credit card numbers, then uses the stolen credit cards to make unauthorized purchases, the service provider's fictitious data linked to the valid marked credit card may also be used by the hacker. Once the marked credit card is used, the service provider may be alerted by receiving a notification on a computing device of the marked credit card use. Credit card alerts may be an alert on a computing device connected to a communication network 116 notifying the credit card owner that the card has been used. The hacker may not know the marked credit card is marked because the credit card is linked to legitimate assets and the payment may have been accepted for the hacker's use of the marked credit card. After being alerted, the service provider may trace the fictitious account with the marked credit card to a specific database by locating, in the service provider repository, the saved data that associates each fictitious account with each credit card. The saved data may show which marked account was used and may show which merchant stored the marked account from the order that was previously placed.

If the hacked database identification program 110a, 110b determines that the marked data has not been used at 206, then the status of the merchant's database is unknown at 208. If a database was not compromised, then the fictitious data account linked to the valid marked credit card may not have been used. Alternatively, if the merchant database was compromised, however, the fictitious data account linked to the marked credit card has not been used yet, then the hacked database identification program 110a, 110b may not identify the compromised database.

If the hacked database identification program 110a, 110b determines that the marked data has been used at 206, then the merchant database has been hacked and the hacked database identification program 110a, 110b will determine which database has been compromised and notify the proper entity at 210. If the fictitious data account linked to the valid marked credit card was used, then the service provider may be notified that the database that stored the fictitious data account linked to the valid marked credit card has been compromised. The hacked database identification program 110a, 110b may notify the service provider, the merchant or the proper authorities. Notifications may be alerted to, for example, the service provider via an alert to a computer 102, a cell phone, a watch, a tablet or a device capable of receiving alert messages.

An additional embodiment to creating a marked account at 202 may include a merchant who has a website that provides an option to save account details for a user for ease of future shopping at the merchant's online store. The service provider may opt to save identifying information using the merchant's website since these features are offered to users for the ability to efficiently and quickly shop at the merchant's online store. The service provider may input an email address, username, password, name, address, phone number and valid credit card number on the merchant database for one profile (i.e., marked account). Opting to save identifying information and payment details on a merchant's website may provide one other method to save the marked account data in the merchant database.

Figure 3:
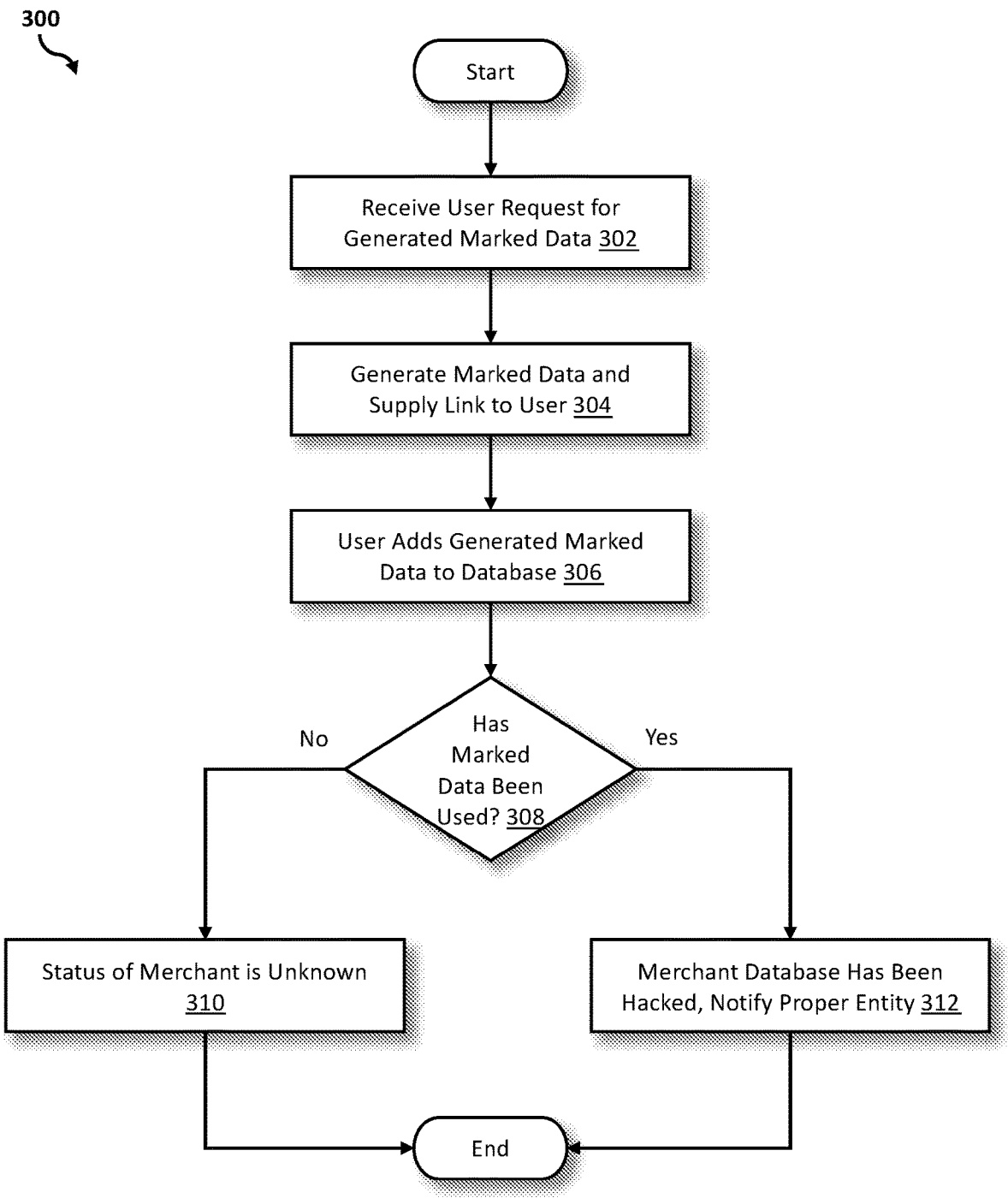
FIG. 3 is an operational flowchart illustrating an additional example of a process for identifying hacked databases according to at least one other embodiment.

Referring now to FIG. 3, an operational flowchart illustrating an additional example of a hacked database identification process 300 used by the hacked database identification program 110a, 110b according to at least one embodiment is depicted.

At 302, a user request for generated marked data is received. The hacked database identification program 110a, 110b may reside, for example, on a server (e.g., server 112) or on a database of a company who offers a service (e.g., the hacked database identification program 110a, 110b) of passively monitoring databases for unauthorized activity. A user, for example, may be a merchant that is paying for the service from a third party or a merchant that purchased the service directly. The service may include access to the hacked database identification program 110a, 110b to formulate fabricated data that may be marked.

When a user would like to generate a marked account, the user may make a request to a hacked database identification program 110a, 110b to provide fabricated data that may be marked to identify use. A user may access the service, for example, through an online portal or website that allows the user to login to the service and generate a marked data account by clicking a button related to generating a marked account. For example, a merchant logs into an account with a company who has access to the hacked identification program 110a, 110b and requests a marked account by clicking on the related button on the computer screen. The related button may include, for example, a link that is described as a link or button to generate data.

Then, at 304, the marked data is generated and a link to access the marked data is also generated. After the user requests the generated marked data, the marked data may be provided or a link may be provided to the user. The link may be provided via a communication network 116 to the user, for example, in an email message, a text message or a link displayed on a computing device (e.g., computer 102) monitor or screen. The link may include access to marked data that may appear to be real (i.e., valid), such as a fictitious name, email address, residence address, phone number and credit card information that appears to be a real name, a real email address, a real residence address and a real credit card number with no special characters (i.e., marks) associated with the marked data. The marked generated data may correspond to data that, when used in the public domain, will trigger the hacked identification program 110a, 110b to alert the user that the data has been attempted to be used. Continuing from the above example, once the user clicks on the link, fabricated data may be generated and marked for use by the merchant. The generated data may be sent (e.g., via email or text message) to the user who may then manually enter the fictitious data into the user (e.g., merchant) database.

At 306, the generated marked data is added to the database by the user. The user may add the generated marked data into the user database or into a database that the user may contract as service by a third party. For example, a merchant sells products in a brick and mortar store and also has an online company website that sell products. The merchant (e.g., user) may use the generated marked data from the provided link at 304 to create an online profile with the merchant's store website. The online profile may allow the merchant to enter and store the fabricated marked information with other non-fictitious customer data. The merchant may also have the option to attempt to purchase an item and although the transaction may be declined, the fictitious customer data (e.g., name, residence address, email address, phone number and credit card number) may still be saved into the merchant database in the created online profile.

By creating the online profile using the generated marked data on merchant's website, the generated marked data may be saved on the database that stores the personal data of the merchant's other customers. The date and time that the marked data is entered, for example, by the merchant into the merchant website, may create a time stamp for reference by the hacked identification program 110a, 110b to identify a timeline for the compromised data. The generated data may be used by a merchant to trace the source of the fraud, for example, the time and date database was compromised once the marked data has been used or has been attempted to be used.

The hacked database identification program 110a, 110b then determines if the marked data has been used at 308. The generated and marked data may appear to be valid data, such as data without any special marks so the hacker may not identify the marked account. The marked data may be connected to an alert system, such as an alert system associated with a credit card company that each time a card is used, an alert may be sent to the user. Use of the marked data may also indicate that the hacker has obtained other customer data that was stored on the same database at the time the hacker obtained the marked data.

If the hacked database identification program 110a, 110b determines that the marked data has not been used at 308, then the status of the merchant is unknown at 310. If a database was not compromised, then the fictitious marked data account may not have been used and the hacked database identification program 110a, 110b may not identify a compromised database.

If the hacked database identification program 110a, 110b determines that the marked data has been used at 308, then the merchant database has been hacked and the merchant or the proper entities may be notified at 312. Marked data may be identified upon use and the alert system on the hacked database identification program 110a, 110b may be triggered. The marked data, such as the fictitious marked data generated at 306, may be created for the purpose of alerting the merchant of an unauthorized use or attempted use. For example, if a hacker has compromised a merchant database and obtained the information (e.g., marked data and other customer data) and the hacker attempts to use the fictitious generated data, then the hacked database identification program 110a, 110b will be triggered to alert the user or authorities. When the marked data is used or attempted to be used, an alert may be sent (e.g., via text, email, alert, notification or voice message) to the user, the merchant, the credit card company or the authorities to identify that a hacker has obtained the marked data and has used the marked data.

Once the marked data is used, the merchant may be alerted by receiving a notification on a computing device (e.g., a computer 102 or a smart phone). The hacker may not know the marked data is not a legitimate asset or account. After being alerted, the user may trace the fictitious marked account to a specific database by locating the saved data in the user accounts (i.e., the user account created with the hacked identification program 110a, 110b and the user account related to the database that was hacked). The saved data may show which marked account was used and which database the marked data was stored in.

It may be appreciated that FIGS. 2-3 provides only an illustration of one embodiment and does not imply any limitations with regard to how different embodiments may be implemented. Many modifications to the depicted embodiment(s) may be made based on design and implementation requirements.

Figure 4:
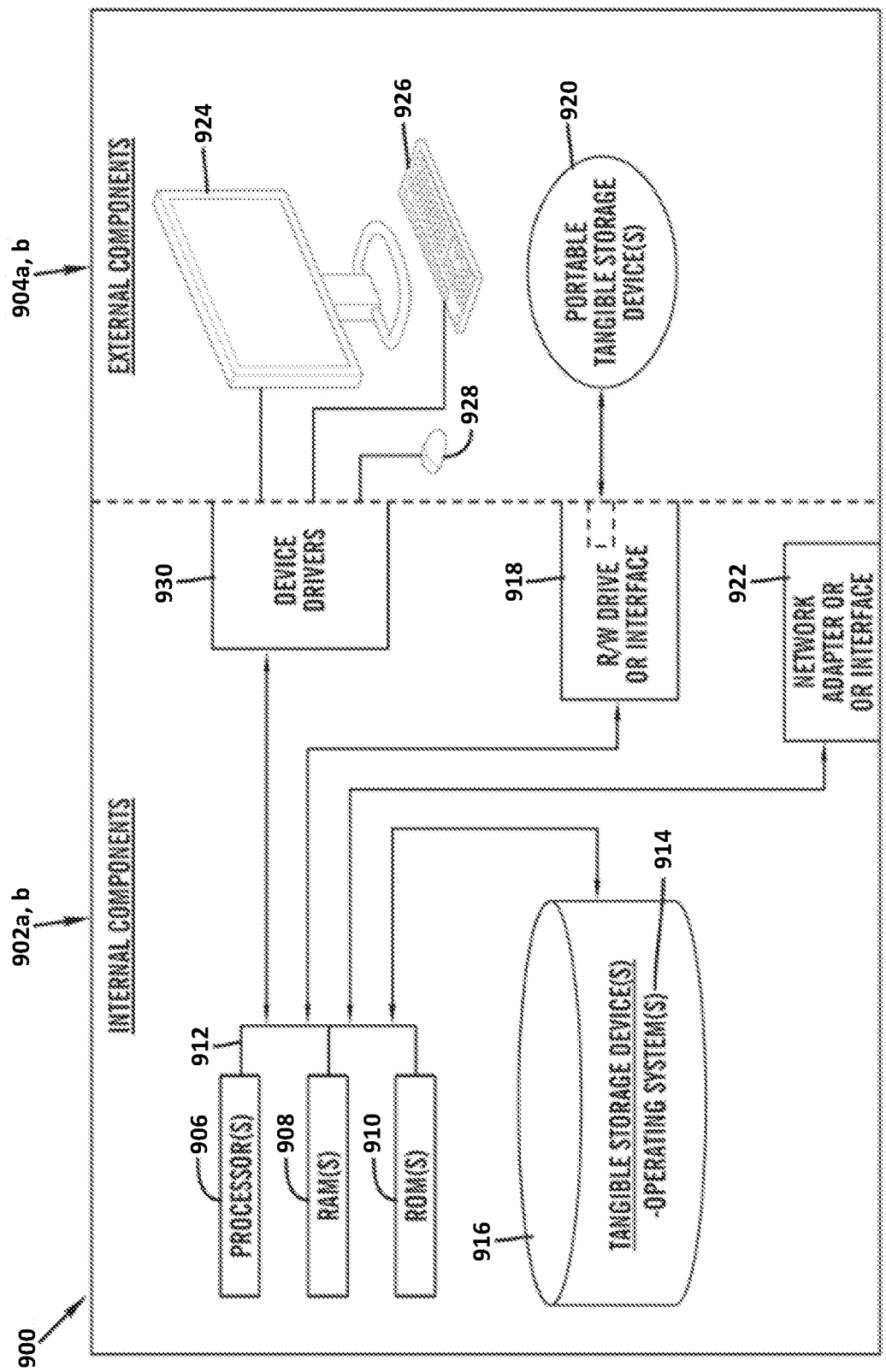
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 4. Each of the sets of internal components 902a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108 and the hacked database identification program 110a in client computer 102, and the hacked database identification program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the hacked database identification program 110a, 110b can be stored on one or more of the respective portable computer-readable tangible storage devices 920, read via the respective R/W drive or interface 918, and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the hacked database identification program 110a in client computer 102 and the hacked database identification program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the hacked database identification program 110a in client computer 102 and the hacked database identification program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
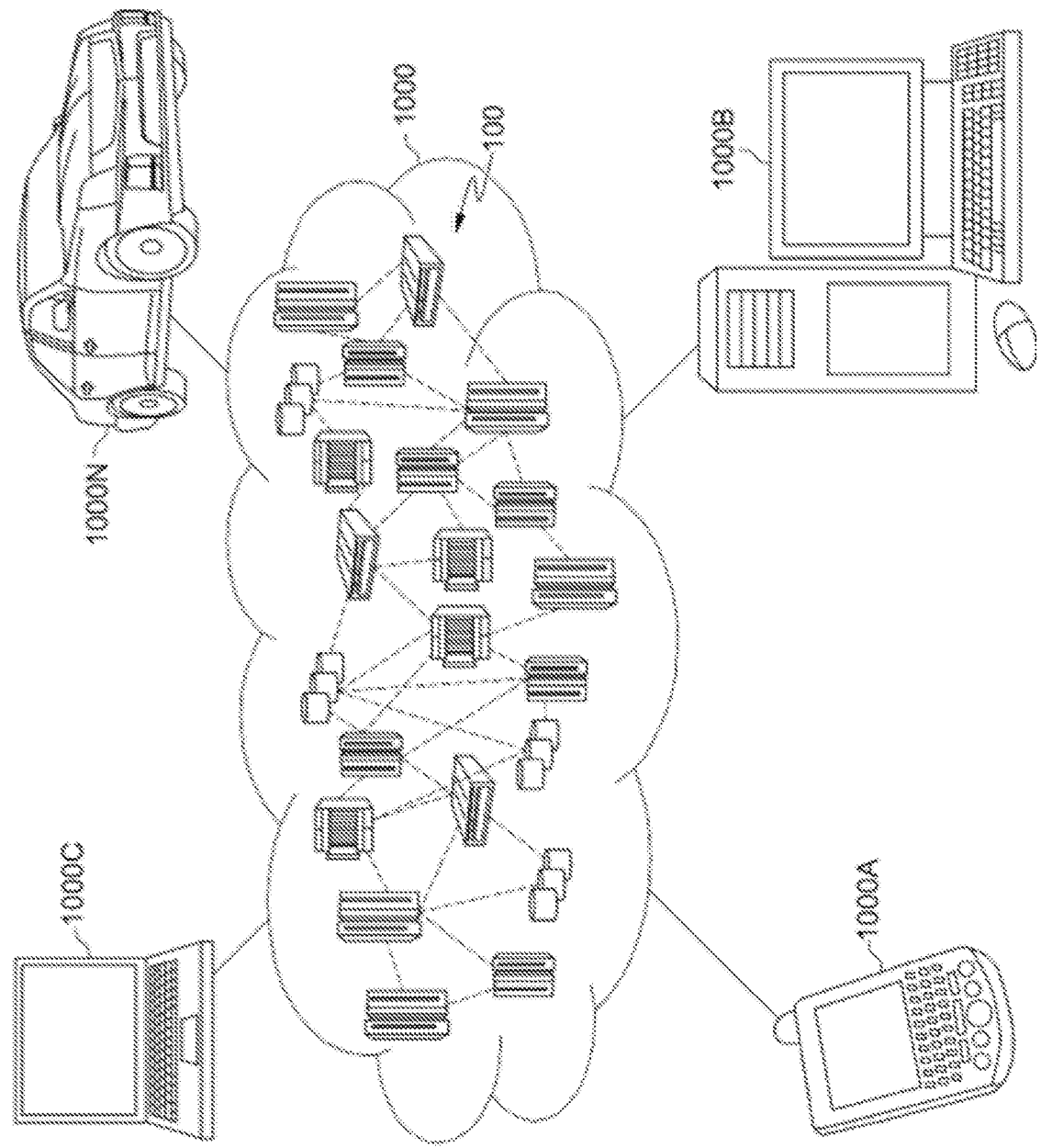
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
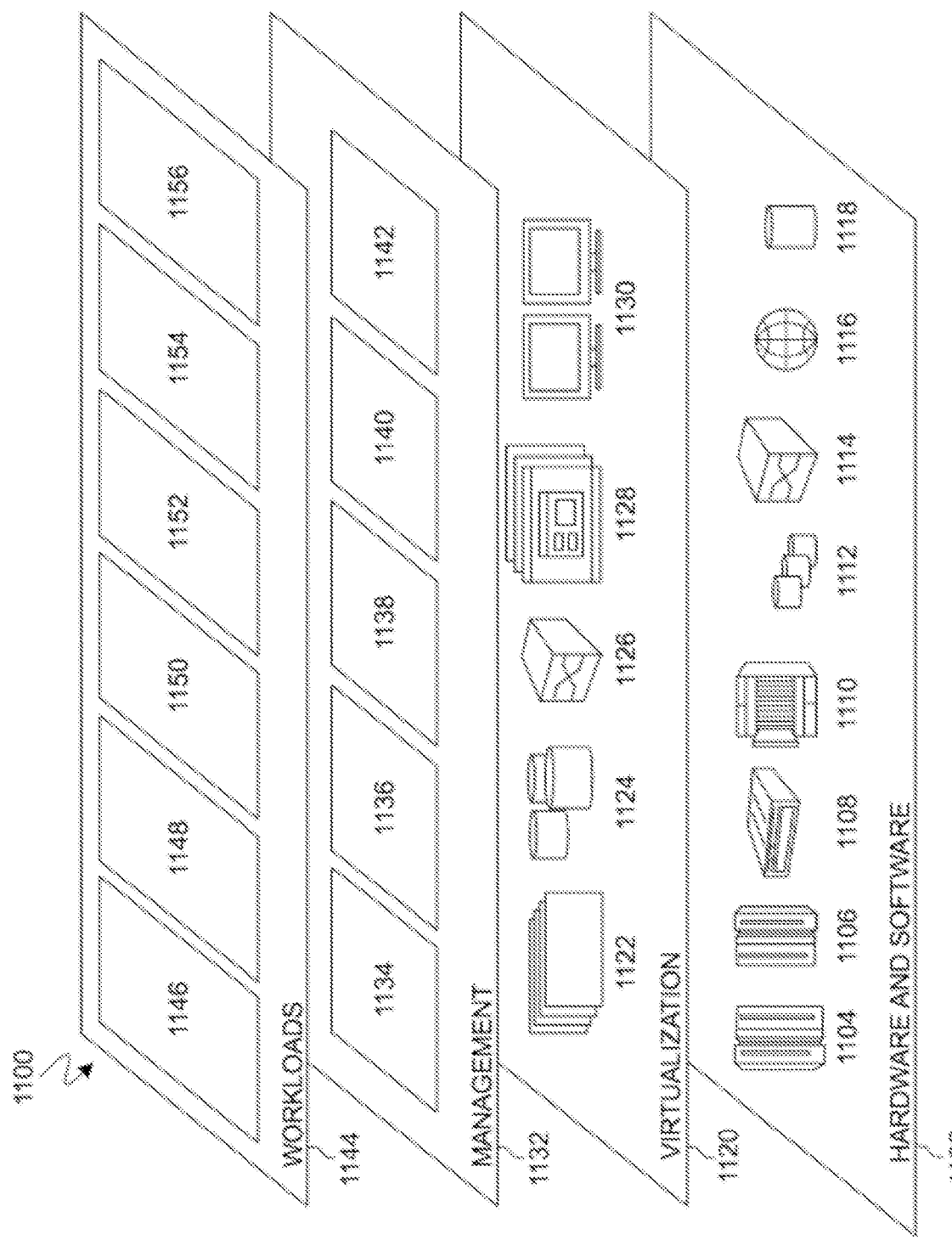
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture-based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and identifying stolen databases 1156. A hacked database identification program 110a, 110b provides a way to know when a network database has been hacked once the hacker attempts to use the compromised data.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for identifying a hacked database, the method comprising:
   generating a marked account, wherein the generated marked account is created by a merchant manually entering marked data into a merchant website;
   initiating a first transaction using the generated marked account, wherein the first transaction is initiated by the merchant to store the marked data on a merchant database;
   determining that an attempted second transaction has occurred using the generated marked account, wherein the attempted second transaction is initiated by an unauthorized user, wherein the marked account is identified when the unauthorized user initiates the attempted second transaction, wherein the attempted second transaction indicates that the merchant database is compromised, wherein the unauthorized user compromised the merchant database to access customers data stored on the merchant database;
   tracing a marked account location to identify a specific merchant database that was compromised, wherein the tracing the marked account identifies a specific set of the customers data that was compromised, wherein the specific set of customers data that was compromised is determined by identifying a time period between the first transaction and the second transaction; and
   receiving, by the merchant, a notification of the attempted second transaction based on identifying the merchant database that was compromised.

2. The method of claim 1, further comprising:
   receiving the first transaction using the generated marked account from an authorized user;
   sending the received marked account to the merchant database; and
   storing the received marked account in the merchant database.

3. The method of claim 1, wherein the generated marked account is a plurality of marked data created to appear as a valid account.

4. The method of claim 1, wherein the first transaction is initiated by the merchant initiating the first transaction on the merchant website.

5. The method of claim 1, wherein the second transaction is initiated by the unauthorized user, wherein the unauthorized user compromised the merchant database to obtain the customers data, wherein the generated marked account was compromised with the customers data, and wherein the generated marked account is used to initiate the second transaction.

6. The method of claim 1, wherein the notification includes a message that the generated marked account was attempted to be used in the second transaction.

7. The method of claim 1, wherein a plurality of marked accounts are generated, wherein the plurality of generated marked accounts are used to initiate a plurality of transactions, and wherein a plurality of initiated transactions identify a time frame for when the attempted second transaction was initiated.

8. A computer system for identifying a hacked database, comprising:

one or more processors, one or more computer-readable memories, one or more computer-readable tangible storage medium, and program instructions stored on at least one of the one or more tangible storage medium when executed by at least one of the one or more processors via at least one of the one or more memories, wherein the computer system is capable of performing a method comprising:

generating a marked account, wherein the generated marked account is created by a merchant manually entering marked data into a merchant website;

initiating a first transaction using the generated marked account, wherein the first transaction is initiated by the merchant to store the marked data on a merchant database;

determining that an attempted second transaction has occurred using the generated marked account, wherein the attempted second transaction is initiated by an unauthorized user, wherein the marked account is identified when the unauthorized user initiates the attempted second transaction, wherein the attempted second transaction indicates that the merchant database is compromised, wherein the unauthorized user compromised the merchant database to access customers data stored on the merchant database;

tracing a marked account location to identify a specific merchant database that was compromised, wherein the tracing the marked account identifies a specific set of the customers data that was compromised, wherein the specific set of customers data that was compromised is determined by identifying a time period between the first transaction and the second transaction; and receiving, by the merchant, a notification of the attempted second transaction based on identifying the merchant database that was compromised.

9. The computer system of claim 8, further comprising:
receiving the first transaction using the generated marked account from an authorized user;
sending the received marked account to the merchant database; and
storing the received marked account in the merchant database.

10. The computer system of claim 8, wherein the generated marked account is a plurality of marked data created to appear as a valid account.

11. The computer system of claim 8, wherein the first transaction is initiated by the merchant initiating the first transaction on the merchant website.

12. The computer system of claim 8, wherein the second transaction is initiated by the unauthorized user, wherein the unauthorized user compromised the merchant database to obtain the customers data, wherein the generated marked account was compromised with the customers data, and wherein the generated marked account is used to initiate the second transaction.

13. The computer system of claim 8, wherein the notification includes a message that the generated marked account was attempted to be used in the second transaction.

14. The computer system of claim 8, wherein a plurality of marked accounts are generated, wherein the plurality of generated marked accounts are used to initiate a plurality of transactions, and wherein a plurality of initiated transactions identify a time frame for when the attempted second transaction was initiated.

15. A computer program product for identifying a hacked database, comprising:
one or more computer-readable tangible storage media and program instructions stored on at least one of the one or more computer-readable tangible storage media, the program instructions when executed by a processor to cause the processor to perform a method comprising:

generating a marked account, wherein the generated marked account is created by a merchant manually entering marked data into a merchant website;

initiating a first transaction using the generated marked account, wherein the first transaction is initiated by the merchant to store the marked data on a merchant database;

determining that an attempted second transaction has occurred using the generated marked account, wherein the attempted second transaction is initiated by an unauthorized user, wherein the marked account is identified when the unauthorized user initiates the attempted second transaction, wherein the attempted second transaction indicates that the merchant database is compromised, wherein the unauthorized user compromised the merchant database to access customers data stored on the merchant database;

tracing a marked account location to identify a specific merchant database that was compromised, wherein the tracing the marked account identifies a specific set of the customers data that was compromised, wherein the specific set of customers data that was compromised is determined by identifying a time period between the first transaction and the second transaction; and receiving, by the merchant, a notification of the attempted second transaction based on identifying the merchant database that was compromised.

16. The computer program product of claim 15, further comprising:
receiving the first transaction using the generated marked account from an authorized user;
sending the received marked account to the merchant database; and
storing the received marked account in the merchant database.

17. The computer program product of claim 15, wherein the generated marked account is a plurality of marked data created to appear as a valid account.

18. The computer program product of claim 15, wherein the first transaction is initiated by the merchant initiating the first transaction on the merchant web site.

19. The computer program product of claim 15, wherein the second transaction is initiated by the unauthorized user, wherein the unauthorized user compromised the merchant database to obtain the customers data, wherein the generated marked account was compromised with the customers data, and wherein the generated marked account is used to initiate the second transaction.

20. The computer program product of claim 15, wherein the notification includes a message that the generated marked account was attempted to be used in the second transaction.

* * * * *